United States Patent [19]

Kuwajima et al.

[11] Patent Number: 5,183,504

[45] Date of Patent: Feb. 2, 1993

[54] AQUEOUS COATING COMPOSITION

[75] Inventors: Teruaki Kuwajima, Higashiosaka; Shinichiro Umeda, Kyoto; Sakuichi Konishi, Ikoma, all of Japan

[73] Assignee: Nippon Paint Co., Ltd., Osaka, Japan

[21] Appl. No.: 703,805

[22] Filed: May 21, 1991

[30] Foreign Application Priority Data

May 21, 1990 [JP] Japan .................................. 2-130861

[51] Int. Cl.⁵ .......................... C09C 1/62; C08J 00/00
[52] U.S. Cl. .................................. 106/404; 106/499; 524/507; 524/555; 524/558
[58] Field of Search ................ 106/499, 404; 524/507, 524/555, 558

[56] References Cited

U.S. PATENT DOCUMENTS

| Re. 31,936 | 7/1985 | Sperry et al. | 524/522 |
|---|---|---|---|
| 4,954,559 | 9/1990 | Hartog et al. | 524/507 |
| 4,978,708 | 12/1990 | Fowler et al. | 524/507 |
| 5,039,343 | 8/1991 | Umeda et al. | 106/404 |

FOREIGN PATENT DOCUMENTS 0285898 10/1988 European Pat. Off. .

*Primary Examiner*—Mark L. Bell
*Assistant Examiner*—Margaret Einsmann
*Attorney, Agent, or Firm*—Wenderoth, Lind & Ponack

[57] ABSTRACT

Disclosed is an aqueous coating composition which keeps in high nonvolatile contents during coating operation and is capable of being effectively applied even under a relatively high humidity condition. The coating composition imparts high orientation of metallic pigment particles to the cured film. The aqueous coating composition of the present invention comprises a specific acryl polymer varnish (a) and a specific urethane oligomer dispersion.

8 Claims, No Drawings

AQUEOUS COATING COMPOSITION

FIELD OF THE INVENTION

The present invention relates to an aqueous coating composition which has good application properties and, when cured, had good surface appearance. In particularly, it relates to an aqueous metallic coating composition which, when coated and cured, has superior orientation of aluminum pigment.

BACKGROUND OF THE INVENTION

The paint layer of motorcars is generally composed of three layers, i.e. an undercoat layer, an intermediate coat layer and an overcoat layer. The overcoat layer is formed by coating a metallic base paint containing a metallic pigment on an intermediate coated plate and then coating a clear paint thereon without baking or curing the metallic base coating (i.e. by so-called "wet-on-wet" method), followed by baking or curing the metallic base coating and clear coating (i.e. by so-called "two coat one bake" method).

The metallic base paint used in this method can exhibit excellent surface appearance in case where flake-like metallic pigment, such as aluminum pigment, is uniformly orientated therein.

Japanese Kokai Publication 58-168664 discloses an aqueous paint which contains an aqueous polyurethane dispersant. However, a problem has occurred in surface appearance because the metallic pigment is not uniformly orientated.

Japanese Kokai Publication 1-287183 discloses an aqueous metallic base paint which contains an acrylic emulsion, a urethane emulsion and a cross-linking agent. Since the paint is an aqueous dispersion, environmental pollution problems do not come about in comparison with solvent type paint, but a problem often occurs in orientation of a metallic pigment and a surface appearance is not always satisfactory.

SUMMARY OF THE INVENTION

The present inventors already proposed an aqueous metallic coating composition using an amide group-containing aqueous acrylic resin (see U.S. application Ser. No. 07/509,508 now U.S. Pat. No. 5,039,343. An improvement has been made on the proposed coating composition and the present invention provides an aqueous coating composition which keeps in high nonvolatile contents during coating operation and capable of being effectively applied even under a relatively high humidity condition. Of course, the coating composition imparts high orientation of metallic pigment particles to the cured film. The aqueous coating composition of the present invention comprises;

(a) an aqueous varnish of a film-forming polymer having a number average molecular weight of 6,000 to 50,000, prepared by copolymerizing 5 to 40% by weight of amide group-containing ethylenic monomers, 3 to 15% by weight of acidic group-containing ethylenic monomers, 10 to 40% by weight of hydroxyl group-containing ethylenic monomers and the balance of the other ethylenic monomers, and a portion of the acid groups is neutralized, (b) an aqueous dispersion of a urethane oligomer in an aqueous medium containing a primary and/or secondary polyamine, prepared by reacting hydroxyl-terminated diol compounds having a molecular weight of 100 to 5,000, diisocyanate compounds and active-hydrogen containing hydrophilic compounds under isocyanate-rich conditions, followed by dispersing the reaction product in the aqueous medium;

the polymer varnish (a) being present in an amount of 95 to 10 wt % (solid) and the oligomer dispersion being present in an amount of 5 to 90 wt % (solid) in the composition.

DETAILED DESCRIPTION OF THE INVENTION

The amide group-containing ethylenic monomers used for obtaining said film-forming polymer (a) according to the present invention are generally (meth)acrylamides. Examples of the (meth)acrylamides are acrylamide, methacrylamide, N,N-dimethylacrylamide, N,N-dimethylmethacrylamide, N,N-dibutylacrylamide, N,N-dibutylmethacrylamide, N,N-dioctylacrylamide, N,M-dioctylmethacrylamide, N-monobutylacrylamide, N-monobutylmethacrylamide, N-monooctylacrylamide, N-monooctylmethacrylamide and the like. Acrylamide or methacrylamide is preferably used.

The acid groups of the acid group-containing ethylenic monomers include a carboxylic group and a sulfonic group. Carboxylic group-containing monomers include styrene derivatives (for example, 3-vinylsalicylic acid, 3-vinylacetylsalicylic acid and the like); and (meth)acrylic acid derivatives (for example, acrylic acid, methacrylic acid, crotonic acid, isocrotonic acid and the like). In addition, sulfonic group-containing ethylenic monomers include p-vinylbenzenesulfonic acid, 2-acrylamidepropanesulfonic acid and the like. The acid group-containing ethylenic monomers may be diesters, such as half esters, half amides and half thioesters. The monomers include half esters, half amides and half thioesters of maleic acid, fumaric acid and itaconic acid. Alcohols for forming the half esters have 1 to 12 carbon atoms and include methanol, ethanol, propanol, butanol, methyl cellosolve, ethyl cellosolve, dimethylamino ethanol, diethylamino ethanol, acetol, allyl alcohol, propargyl alcohol and the like. Preferred are butanol, dimethylamino ethanol, dimethylamino ethanol, acetol, allyl alcohol and propagyl alcohol. Mercaptanes for forming half thioesters have 1 to 12 carbon atoms and include ethyl mercaptane, propyl mercaptane, butyl mercaptane and the like. Amines for forming half amides have 1 to 12 carbon atoms and include ethylamine, diethylamine, butylamine, dibutylamine, cyclohexylamine, aniline, naphthylamine and the like. Among them, half thioesters have a little problem in odor and half esters and half amides are preferably used. Reactions, such as half esterification, half thioesterification and half amidization, are carried out at temperatures of room temperature to 120° C. according to the usual methods and with tertiary amines as a catalyst under certain circumstances.

The hydroxylic group-containing ethylenic monomers include 2-hydroxyethyl acrylate, 2-hydroxypropyl acrylate, 2-hydroxyethyl methacrylate, 2-hydroxypropyl methacrylate, 2,4-dihydroxy-4'-vinyl benzophenone, N-(2-hydroxyethyl) acrylamide, N-(2-hydroxyethyl) methacrylamide and the like.

The film-forming polymers according to the present invention are obtained by copolymerizing the above described monomers with other ethylenic monomers by the known methods. The other ethylenic monomers include styrene, alpha-methylstyrene, acrylic esters (e.g. methyl acrylate, ethyl acrylate, butyl acrylate or 2-ethylhexyl acrylate), methacrylic esters (e.g. methyl methacrylate, ethyl methacrylate, butyl methacrylate, isobutyl methacrylate and p-butyl methacrylate) and the like. The amide group-containing ethylenic monomers used for the preparation of the film-forming polymers are used in a quantity of 5 to 40% by weight, preferably 8 to 30% by weight. If they are used in a quantity less than 5% by weight, a disadvantage occurs in that flake-like metallic pigments have poor orientation and thus a surface appearance is poor while if they are used in a quantity exceeding 40% by weight, the obtained film has poor water resistance. The acid group-containing ethylenic monomers are used in a quantity of 3 to 15% by weight, preferably 5 to 13% by weight. If they are used in a quantity less than 3% by weight, an aqueous dispersibility is deteriorated while if they are used in a quantity exceeding 15% by weight, the film is deteriorated in water resistance. The hydroxylic group-containing ethylenic monomers are used in a quantity of 10 to 40% by weight, preferably 13 to 30% by weight. If they are used in a quantity less than 10% by weight, the film is deteriorated in curing ability while if they are used in a quantity exceeding 40% by weight, the film is deteriorated in water resistance. The obtained polymers have a number average molecular weight of 6,000 to 50,000, preferably 8,000 to 30,000. If it is less than 6,000, they are insufficient in operating ability and curing ability while if it exceeds 50,000, a nonvolatile content during coating is excessively reduced and thus a workability is deteriorated. In addition, a molecular weight was measured by the GPC method.

The hydroxyl-terminated diol compounds have a molecular weight of 100 to 5,000, which are used for the preparation of said aqueous dispersion (b) according to the present invention, are typically polyether diols or polyester diols. The compounds include polymers or copolymers of alkylene oxides (ethylene oxide, propylene oxide, methylene oxide and the like) and/or heterocyclic ethers (tetrahydrofuran and the like). Typical examples of the compounds are polyethylene glycol, polypropylene glycol, polyethylene-propylene glycol, polytetramethylene ether glycol, polyhexamethylene ether glycol and polyoctamethylene ether glycol; polyethylene adipate, polybutylene adipate, polyhexamethylene adipate, polyneopentyl adipate, poly-3-methylpentyl adipate, polyethylene-butylene adipate and polyneopentyl-hexyl adipate; polylactone diol, for example polycarprolactone diol and poly-3-methylvalerolactone diol; polycarbonate diol; and mixtures thereof. Preferred is polycarbonate diol, in view of water resistance and adhesive properties of the cured film.

The diisocyanate compounds used in the present invention include aliphatic diisocyanantes, for example hexamethylene diisocyanate, 2,2,4-trimethylhexane diisocyanate and lysine diisocyanate; alicyclic diisocyanates having 4 to 18 carbon atoms, for example 1,4-cyclohexane diisocyanate, 1-isocyanato-3-isocyanatomethyl-3,5-trimethylcyclohexane (isophoron diisocyanate), 4,4'-dicyclohexylmethane diisocyanate, methylcyclohexylene diisocyanate and isopropylidenecyclohexyl-4,4'-diisocyanate; modified compounds of the diisocyanates; and mixtures thereof. Preferred are hexamethylene diisocyanate, isophoron diisocyanate.

The active-hydrogen containing hydrophilic compounds are compounds which have at least one active hydrogen (e.g. a hydroxyl group) in a molecule and having a hydrophilic group (e.g. a carboxylic group) and includes dimethylolacetic acid, dimethylolpropionic acid, dimethylolbutyric acid and the like. Preferred are dimethylolpropionic acid.

In case of the preparation of the hydrophilic group-containing oligomers according to the present invention, a reaction is conducted under isocyanate-rich conditions, for example at NCO/OH equivalent ratio within a range of 1.1 to 1.9. The reaction easily occurs by mixing all compounds. The reaction may be conducted in a solvent if necessary. The obtained hydrophilic group-containing oligomers are dispersed in an aqueous medium which contains the primary and/or secondary polyamine. In this dispersing process, the hydrophilic group in the hydrophilic group-containing oligomers is neutralized. Examples of the polyamines are (ethylenediamine, 1,2-propylenediamine, 1,3-propylenediamine, isophoronediamine, propane-2,2-cyclohexylamine, N,N-dimethyl-o-phenylenediamine, N,N'-dimethyl-o-phenylenediamine, N,N'-di-p-tolyl-m-phenylenediamine, p-aminodiphenylamine, hydradine, substituted hydradine (e.g. dimethylhydradine and 1,6-hexamethylenebis-hydradine), N-beta-aminoethylethanolamine and the like.

The aqueous coating composition of the present invention can be used for any type coating usages, but usually is used for a thermosetting aqueous coating composition in combination with a curing agent. The curing agent is generally a melamine resin. The melamine resin is preferably a water-soluble melamine resin, including Cymel-303 available from Mitsui Toatsu Chemicals Inc. and Sumimal N-W available from Sumitomo Chemical Co. Ltd. and the like but it is not specially limited by them. Also a water-insoluble melamine resin can be used. The melamine resin is used in a quantity of 5 to 60% by weight based on the film-forming polymer (a) (as measured in solid content). If the melamine resin is used in an excessive small quantity, curing ability is insufficient, while, if it is used in an excessive large quantity, the cured film is too hard and thus fragile.

The aqueous coating composition of the present invention may usually contain metallic pigments (for example aluminum pigments, bronze pigments, mica, gold pigments and silver pigments). The metallic pigments are added in a quantity of 2 to 100 parts by weight based on 100 parts by weight (solid) of the aqueous coating composition. In addition, various kinds of additives (for example an ultraviolet inhibitor, an anti-foamant and a surface-regulating agent) and usual inorganic pigments may be added in the aqueous coating composition according to the present invention.

The aqueous metallic coating composition of the present invention is remarkably superior in orientation of metal flakes and superior in surface appearance of the obtained film. In addition, nonvolatile contents are high during coating operation and the aqueous metallic paint is superior in also applicability.

EXAMPLES

The present invention will be below described in more detail with reference to the preferred Examples. However, the present invention is not limited by these Examples.

Production of film-forming polymer (a)

Production Example 1

Ethylene glycol monobutyl ether of 76 parts by weight was charged in a reaction vessel having a capacity of 1 liter, equipped with with a stirrer, a temperature regulator and a condenser, and then 61 parts by weight of a monomer solution, which comprised 15 parts by weight of styrene, 63 parts by weight of methyl methacrylate, 48 parts by weight of 2-hydroxydiethyl methacrylate, 117 parts by weight of n-butyl acrylate, 27 parts by weight of methacrylic acid, 30 parts by weight of acrylamide and 3 parts by weight of azobisisobutylonitrile, was added thereto and heated to 120° C. with stirring. Then, the remaining 245 parts by weight of the monomer solution was added for 3 hours and the resulting mixture was stirred for 1 hour. Further, 28 parts by weight of dimethylethanolamine and 200 parts by weight of deionized water were added to the resulting mixture to obtain an acrylic resin varnish having nonvolatile content of 50%, and the acrylic resin had a number average molecular weight of 12,000. This resin is characterized in that its OH value is 70 and its acid value is 58.

Production Example 2

A 3 liter reaction vessel, equipped with a nitrogen gas introducing tube, a temperature controller, a dropping funnel, a stirrer and a decanter, was charged with 500 parts by weight of 2-ethoxy propanol, and heated to 100° C. A solution of 50 parts by weight of styrene, 50 parts by weight of methyl methacrylate, 200 parts by weight of 2-hydroxyethyl methacrylate, 120 parts by weight of 2-ethylhexyl methacrylate, 380 parts by weight of butyl acrylate, a solution of 100 parts by weight of monobutyl maleate and 300 parts by weight of methanol, 100 parts by weight of acrylamide and 30 parts by weight of azobisisobutylonitrile was added thereto through the dropping funnel. The addition was conducted for 3 hours with removing methanol with the decanter at 100° C. The resulting mixture was stirred for further 30 minutes and then a solution comprising 50 parts by weight of butyl acetate and 3 parts by weight of t-butylperoxy-2-ethylhexanoate was added dropwise to it for 0.5 hours. Subsequently, the resulting mixture was held at 100° C. for further 1.5 hours to distill off 300 parts by weight of methanol, followed by distilling off 200 parts by weight of the solvent under a reduced pressure. Further, 100 g of dimethylethanolamine and 570 g of deionized water were added to the resulting solution to obtain a transparent and viscous acrylic resin water-solubilized varnish having a nonvolatile content of 50% and a number average molecular weight of 10,000.

Production of urethane-containing aqueous dispersion (b)

Production Example 3

Synthesis of hydrophilic group-containing oligomers

A 5 liter reaction vessel, equipped with a thermometer, a stirrer, a condenser and a dropping funnel, was charged with 40.2 parts by weight of dimethylolpropionic acid, 30 parts by weight of triethylamine and 312 parts by weight of N-methylpyrrolidone and heated to 90° C. to be dissolved. Then, 290 parts by weight of isophorone diisocyanate and 700 parts by weight of polypropylene glycol (having a molecular weight of 1,000) were added to the resulting solution and stirred for 10 minutes, followed by adding 1.03 parts by weight of dibutyltin dilaurate. Subsequently, the resulting mixture was heated to 95° C. to react 1 hour.

Preparation of aqueous dispersion

A 5 liter reaction vessel, equipped with a thermometer, a stirrer, a condenser and a dropping funnel, was charged with 1,750 parts by weight of deionized water and 9.2 parts by weight of hydrazine hydrate and then the above obtained solution of urethane prepolymer was added with stirring. Subsequently, the resulting mixture was stirred for 30 minutes. The obtained composition was cloudy and stable aqueous dispersion, and had an acid value of 16.2 and a nonvolatile content of 33%.

Production Example 4

Synthesis of hydrophilic group-containing oligomers

The same reaction vessel as Production Example 3 was charged with 40.2 parts by weight of dimethylolpropionic acid, 30 parts by weight of triethylamine and 402 parts by weight of N-methylpyrrolidone and heated to 90° C. to be dissolved. Then, 290 parts by weight of isophorone diisocyanate and 600 parts by weight of polypropylene glycol (having a molecular weight of 2,000) were added to the resulting solution and stirred for 10 minutes, followed by adding 1.3 parts by weight of dibutyltin dilaurate. Subsequently, the resulting mixture was heated to 95° C. to react 1 hour.

Preparation of aqueous dispersion

The same reaction vessel as Production Example 3 was charged with 2,293 parts by weight of deionized water and 11.5 parts by weight of hydrazine hydrate and then the above obtained solution of urethane prepolymer was added with stirring. Subsequently, the resulting mixture was stirred for 30 minutes. The obtained composition was cloudy and stable aqueous dispersion, and had an acid value of 12.5 and a nonvolatile content of 33%.

Production Example 5

A hydrophilic oligomer was prepared as generally described in Production Example 3, with the exception that polycarbonate diol having a number average molecular weight of 1,000 (available from Daicel Chemical Co., Ltd. as PLACCEL CD-211PL) was employed instead of polypropylene glycol. An aqueous dispersion also was also prepared as generally described in Production Example 3 to obtain urethan polymer dispersion having a nonvolatile content of 33% and an acid value of 16.0.

Preparation of clear paint

Production Example 6

A clear paint was prepared by mixing the following ingredients in a stainless vessel.

| Ingredients | Parts by weight |
|---|---|
| Varnish[1] | 100 |
| Uban 20 SE-60 | 36 |
| Modaflow (available from Monsant Company) | 0.5 |
| Resin particles[2] | 2.2 |

[1] A reaction vessel, equipped with a stirrer, a temperature controller and a condenser, was charged with 70 parts by weight of xylene and 20 parts by weight of n-butanol. Separately a monomer solution was prepared from 1.2 parts by weight of methacrylic acid, 26.4 parts by weight of styrene, 26.4 parts by weight of methyl methacrylate, 36.0 parts by weight of n-butyl -continued acrylate, 10.0 parts by weight of 2-hydroxyethyl acrylate and 1.0 part by weight of azobisisobutylonitrile. To the reaction vessel, 20 parts by weight of the monomer solution was added and heated with stirring. The remaining 81.0 parts by weight of the monomer solution was added dropwise for 2 hours with refluxing, to which a solution of 0.3 parts by weight of azobisisobutylonitrile and 10 parts by weight of xylene was added dropwise for 30 minutes. The resultant solution was further refluxed for 2 hours to obtain an acryl varnish having an OH value of 48, a number average molecular weight of 8,000 and a nonvolatile content of 50%.

[2]A one liter reaction vessel, equipped with a stirrer, a temperature controller and a condenser, was charged with 282 parts by weight of deionized water, 10 parts by weight of a polyester resin (obtained note 3 hereinafter) and 0.75 parts by weight of dimethylethanolamine and mixed at 80° C. to dissolve the content. A solution of 45 parts by weight of azobiscyanovaleric acid, 45 parts by weight of deionized water and 4.3 parts by weight of dimethylethanolamine was added, and then a monomer mixture of 70.7 parts by weight of methyl methacrylate, 94.2 parts by weight of n-butyl acrylate, 70.7 parts by weight of styrene, 30 parts by weight of 2-hydroxyethyl acrylate and 4.5 parts by weight of ethyleneglycol dimethacrylate was added dropwise for 60 minutes. After completion of addition, a solution of 1.5 of azobiscyanovaleric acid, 15 parts by weight of deionized water and 1.4 parts by weight of dimetehylethanol- amine was added and mixed at 80° C. for 60 minutes to obtain an emulsion having a particle size of 0.156 micron, a nonvolatile content of 45%, pH 7.2 and a viscosity of 92 cps (25° C.). The obtained emulsion was spray-dried to remove water and redispersed in 200 parts by weight of xylene based on 100 parts by weight of the resin particles. The obtain dispersion had a particle size of 0.3 micron.

[3]Preparation of polyester resin
A 2 liter reaction vessel, equipped with a stirrer, a nitrogen gas introducing tube, a temperature controller, a condenser and a decanter, was charged with 134 parts by weight bishydroxy- ethyltaurine, 130 parts by weight of neopentyl glycol, 236 parts by weight of azelaic acid, 186 parts by weight of phthalic anhydride and 27 parts by weight of xylene, and heated to azeo- tropically remove water with xylene. After starting reflux, it was slowly heated to 190° C. over about 2 hours and then mixing and dehydration continued until an acid value of the carboxylic group reached 145. It was then cooled to 140° C. at which 314 parts by weight of versatic glycidyl ester (available from Shell Chemical Company as Cardure E 10) was added dropwise for 30 minutes. Thereafter, mixing continued for 2 hours to terminate reaction. The obtained polyester resin had 59 acid value, 90 hydroxyl value and Mn 1,054.

Production Example 7

A clear paint was prepared by mixing the following ingredients in a stainless vessel.

| Ingredients | Parts by weight |
|---|---|
| Varnish[4] | 100 |
| Desmodule N-75 | 16.7 |

[4]A reaction vessel, equipped with a stirrer, a temperature con- troller and a condenser, was charged with 57 parts by weight of xylene and 6 parts by weight of n-butanol. Separately a monomer solution was prepared from 30.0 parts by weight of styrene, 45.2 parts by weight of ethylhexyl methacrylate, 5.5 parts by weight of ethylhexyl acrylate, 16.2 parts by weight of 2-hydroxyethyl methacrylate, 3.1 parts by weight of methacrylic acid and 4.0 part by weight of azobisisobutylonitrile. To the reaction vessel, 20 parts by weight of the monomer solution was added and heated with stirring. The remaining 84.0 parts by weight of the monomer solution was added dropwise for 2 hours with refluxing, to which a solution of 0.5 parts by weight of azobisisobutylonitrile, 23 parts by weight of xylene and 14 parts by weight of n-butanol was added dropwise for 20 minutes. The resultant solution was further refluxed for 2 hours to obtain an acryl varnish having an OH value of 70, a number average molecular weight of 3,400 and a nonvolatile content of 50%.

Production Example 8

A clear paint was prepared by mixing the following ingredients in a stainless vessel and diluting with a thin- ner of butyl acetate/xylene = 1/1.

| Ingredients | Parts by weight |
|---|---|
| Compound having carboxylic anhydride[5] | 130 |
| Blocked amine compound[6] | 25 |
| Compound having an alkoxysilyl[7] | 65 |
| Tinubin 900 | 1.5 |
| Irukanox 1010 | 1.0 |

[5]A one liter reaction vessel, equipped with a stirrer, a temperature controller and a condenser, was charged with 120 parts by weight of butyl acetate and heated to 100° C. Separately a monomer solution was prepared from 21 parts by weight of n-butyl acrylate, 95 parts by weight of n-butyl methacrylate, 34 parts by weight of 2-ethylhexyl methacrylate, 45 parts by weight of itaconic anhy- dride, 60 parts by weight of dioxane and 20 parts by weight of t-butylperoxy hexanoate. To the reaction vessel, the monomer solution was added dropwise for 3 hours and mixed for another 2 hours to obtain an acryl resin having carboxylic anhydride groups. It had a number average molecular weight of 2,500 and a non- volatile content of 51%.

[6]A reaction vessel, equipped with a stirrer, a condenser with a water separator and a thermometer, was charged with 133 g of diisopropanolamine and 70 g toluene, to which 76 g of isobutyl aldehyde was added dropwise for one hour while it was cooled with ice. Water was removed with refluxing for 5 hours and then 84 g of 1,6-hexane diisocyanate and 20 g of xylene were added dropwise for one hour. It was reacted at 70 to 80° C. for 8 hours to obtain a blocked amine compound.

[7]Preparation of a compound having alkoxy silyl group
A one liter reaction vessel, equipped with a stirrer, a temperature controller, a condenser and a decanter, was charged with 200 g of xylene, and heated to 120° C. Separately, a monomer solution was prepared from 150 g of 3-methacryloxypropyltrimethoxysilane, 20 g of n-butyl acrylate, 30 g of methyl methacrylate and 15 g of t-butylperoxy hexanoate. It was added dropwise to the reaction vessel over 3 hours, and then reacted for another 2 hours to obtain a polymer having an alkoxysilyl group with a number average molecular weight of 2,000 and a nonvolatile content of 52%.

Production Example 9

A clear paint was prepared by mixing the following ingredients in a stainless vessel and diluting with a thin- ner of butyl acetate/xylene = 1/1.

| Ingredients | Parts by weight |
|---|---|
| Compound having carboxylic anhydride[5] | 130 |
| Oxazolidine compound[8] | 13 |
| Compound having an alkoxysilyl[7] | 65 |
| 3,4-Epoxycyclohexylmethyl-3,4-epoxycyclohexane carboxylate | 7 |
| Tinubin 900 | 1.5 |
| Irukanox 1010 | 1.0 |

[8]A reaction vessel, equipped with a stirrer, a condenser with a water separator and a thermometer, was charged with 200 g of benzene and 133 g of diisopropanolamine, to which 75 g of isobutyl aldehyde was added dropwise at room temperature for one hour. Water was removed with refluxing for 5 hours and benzene was removed under reduced pressure to obtain a hydro- xyoxazolidine compound. The water separator was detached and 1,000 g of hexane and 103 g of triethylamine were charged in the reaction vessel, to which 64.6 g of dichlorodimethylsilane was added dropwise for 2 hours. It was then reacted at room temper- ature for 2 hours and white precipitate was filtered away. The filtrate was condensed to obtain an oxazolidine compound.

Production Example 10

A one liter reaction vessel, equipped with a stirrer, a temperature controller and a condenser, was charged with 40 parts by weight of ethoxy propanol. To the content, 121.7 parts by weight of a monomer solution, which contained 4 parts by weight of sytrene, 35.96 parts by weight of n-butyl acrylate, 18.45 parts by weight of ethylhexyl methacrylate, 13.92 parts by weight of 2-hydroxyethyl methacrylate, 7.67 parts by weight of methacrylic acid, 40 parts by weight of a solution of 20 parts by weight of ethoxy propanol and 20 parts by weight of acidphosphoxy(oxypropylene) monomethacrylate, and 1.7 parts by weight of azobisisobutylonitrile, was added dropwise for 3 hours and then mixed for another one hour. The resultant acryl resin had an acid value of 105, OH value of 60, a number average molecular weight of 6,000 and a nonvolatile content of 63%.

Preparation of aqueous coating composition

Example 1

Fifteen parts by weight of an aluminum pigment paste (65% aluminum content available from Toyo Aluminum Co., Ltd. as Alpaste 7160N) was uniformly mixed with 30 parts by weight of Cymel 303 (methoxylated methylol melamine available from Mitsui Toatsu Chemicals Inc.), with which 2 parts by weight of isostearyl acidphosphate (available from Sakai Chemical Co., Ltd. as Phophorex A-180L) was mixed to obtain an aluminum pigment solution.

It is mixed with 112 parts by weight of the film-forming polymer of Production Example 1 and then mixed with 43 parts by weight of the urethane emulsion of Production Example 3 to obtain an aqueous metallic paint.

Example 2 and 3

Aqueous metallic paints were obtained from the respective ingredients shown in Table 1 in the same manner as in Example 1.

180L made by Sakai Kagaku KK) of 2 parts by weight was added to the resulting uniform mixture followed by uniformly mixing the resulting mixture to obtain an aluminum pigment solution. Then, aqueous metallic paints were obtained from the respective ingredients shown in Table 1 in the same manner as in Example 1.

Comparative Example 1

Production of the Resin for the Aqueous Metallic Paint

An aqueous metallic paint was produced in the same manner as in Production Example 1 excepting that 45 parts by weight of styrene was used and acrylic amide was not used.

Preparation of the Comparative Aqueous Metallic Paint

An aqueous metallic paint was prepared in the same manner as in Example 1 excepting that the above described resin was used in place of the film-forming polymer produced according to Production Example 1.

Comparative Example 2

An aqueous metallic paint was produced by uniformly dispersing the aluminum pigment solution in the film-forming polymer obtained according to Production Example 1 of 140 parts by weight in the same manner as in Example 1.

Evaluation of coatings

Tests 1 to 10

A polished mild steel plate was subjected to a degrease and chemical treatment, and then coated with an electrodeposition paint in an intermediate coating line to obtain an intermediate coated steel panel. It was then coated with the aqueous metallic paint as shown in Table 2, and then coated with the clear paint as shown in Table 2. The metallic paint was spray-coated at 23°

TABLE 1

|  | Example 2 | Example 3 | Example 4 | Example 5 | Example 6 |
|---|---|---|---|---|---|
| Film-forming polymer (I) | Production Example 2 80 parts by weight | Production Example 1 112 parts by weight | Production Example 1 80 parts by weight | Production Example 2 112 parts by weight | Production Example 2 80 parts by weight |
| Urethane group-containing aqueous suspension (II) | Production Example 3 91 parts by weight | Production Example 4 43 parts by weight | Production Example 3 91 parts by weight | Production Example 3 43 parts by weight | Production Example 5 91 parts by weight |

Examples 4 and 5

Cymel 303 (methoxy methylol melamine made by Mitsui Toatsu KK) of 30 parts by weight was added to an aluminum pigment paste (Alpaste 7160 N containing metallic aluminum in a quantity of 65% made by Toyo Aluminum KK) of 15 parts by weight and the acrylic varnish obtained according to Production Example 10 of 4 parts by weight was added to the resulting mixture followed by uniformly mixing the resulting mixture. Subsequently, isostearil acid phosphate (Phosrex A-

C. and relative humidity of 85% so as to obtain a 20 micron layer, and the clear paint was also spray-coated at the same condition so as to obtain a 30 micron layer. The metallic paint was coated in two stages with one minute interval and then preheated at 80° C. for 5 minutes. Then, the clear paint was coated in one stage and subjected to a setting for 7 minutes. The coated panel was baked at 140° C. for 30 minutes and subjected to evaluations of adhesive properties and water resistance.

TABLE 2

| No. | 1 | 2 | 3 | 4 | 5 | 6 | 7 | 8 | 9 | 9 | 10 |
|---|---|---|---|---|---|---|---|---|---|---|---|
| Aqueous metallic paint | Ex. 1 | Ex. 1 | Ex. 1 | Ex. 1 | Ex. 2 | Ex. 3 | Ex. 4 | Ex. 5 | Ex. 6 | Comp. Ex. 1 | Comp. Ex. 2 |
| Clear | Pro. Ex. 6 | Pro. Ex. 7 | Pro. Ex. 8 | Pro. Ex. 9 | Pro. Ex. 8 | Pro. Ex. 9 | Pro. Ex. 8 | Pro. Ex. 9 | Pro. Ex. 8 | Pro. Ex. 9 | Pro. Ex. 9 |
| Content of nonvolatile ingredients at the application of the metallic paint | 24% | 24% | 24% | 24% | 26% | 23% | 25% | 24% | 26% | 25% | 18% |
| External appearance | ◯ | ◯ | ◯ | ◯ | ◯ | ◯ | ◯ | ◯ | ◯ | X | X |

TABLE 2-continued

| No. | 1 | 2 | 3 | 4 | 5 | 6 | 7 | 8 | 9 | 9 | 10 |
|---|---|---|---|---|---|---|---|---|---|---|---|
| Adherence | O | O | O | O | O | O | O | O | O | X | O |

What is claimed is:

1. An aqueous coating composition comprising:
   (a) an aqueous varnish of a film-forming polymer having a number average molecular weight of 6,000 to 50,000, prepared by copolymerizing 5 to 40% by weight of a (meth)acrylamide, 3 to 15% by weight of acidic group-containing ethylenic monomers, 10 to 40% by weight of hydroxyl group-containing ethylenic monomers and the balance of ethylenic monomers other than acidic group-containing ethylenic monomers and hydroxy group-containing ethylenic monomers, and a portion of the acid groups is neutralized,
   (b) an aqueous dispersion of a urethane oligomer in an aqueous medium containing either a primary or secondary polyamine or both, prepared by reacting polycarbonate diols having a molecular weight of 100 to 5,000, diisocyanate compounds and active-hydrogen containing hydrophilic compounds under isocyanate-rich conditions, followed by dispersing the reaction product in the aqueous medium;
   said polymer varnish (a) being present in an amount of 95 to 10 wt % (solid) and the oligomer dispersion being present in an amount of 5 to 90 wt % (solid) in said composition.

2. The aqueous coating composition according to claim 1 wherein said acid group-containing ethylenic monomers are selected from the group consisting of salicylic acid derivatives, (meth)acrylic acid, p-vinylbenzenesulfonic acid, 2-acrylamide-propanesulfonic acid, and half esters, half amides and half thioesters of maleic acid, fumaric acid and itaconic acid.

3. The aqueous coating composition according to claim 1 wherein said hydroxylic group-containing ethylenic monomers are selected from the group consisting of 2-hydroxyethyl methacrylate, 2-hydroxypropyl acrylate, 2-hydroxypropyl methacrylate, 2,4-dihydroxy-4'-vinyl benzophenone, N-2(-hydroxyethyl) acrylamide and N-(2-hydroxyethyl) methacrylamide.

4. The aqueous coating composition according to claim 1 wherein said diisocyanate compounds are selected from the group consisting of aliphatic diisocyanates and alicyclic diisocyanates having 4 to 18 carbon atoms.

5. The aqueous coating composition according to claim 1 wherein said active-hydrogen containing hydrophilic compounds are selected from the group consisting of dimethylolacetic acid, dimethylolpropionic acid and dimethylolbutyric acid.

6. The aqueous coating composition according to claim 1 wherein said isocyanate-rich conditions is within the range of NCO/OH equivalent ratio of 1.1 to 1.9.

7. The aqueous coating composition according to claim 1 further comprising a metallic pigment and a curing agent.

8. The aqueous coating composition according to claim 7 wherein said metallic pigment is aluminum pigment and said curing agent is melamine resin.

* * * * *